US012568003B2

(12) United States Patent
Goto et al.

(10) Patent No.: US 12,568,003 B2
(45) Date of Patent: Mar. 3, 2026

(54) WIRELESS COMMUNICATION SYSTEM, COMMUNICATION APPARATUS, RECEIVING APPARATUS AND WIRELESS COMMUNICATION METHOD

(71) Applicant: NTT, Inc., Tokyo (JP)

(72) Inventors: Daisuke Goto, Musashino (JP); Kiyohiko Itokawa, Musashino (JP); Yasuyoshi Kojima, Musashino (JP); Kazumitsu Sakamoto, Musashino (JP); Tomoya Kageyama, Musashino (JP)

(73) Assignee: NTT, Inc., Tokyo (JP)

( * ) Notice: Subject to any disclaimer, the term of this patent is extended or adjusted under 35 U.S.C. 154(b) by 66 days.

(21) Appl. No.: 18/727,873

(22) PCT Filed: Jan. 19, 2022

(86) PCT No.: PCT/JP2022/001755
§ 371 (c)(1),
(2) Date: Jul. 10, 2024

(87) PCT Pub. No.: WO2023/139679
PCT Pub. Date: Jul. 27, 2023

(65) Prior Publication Data
US 2025/0106073 A1       Mar. 27, 2025

(51) Int. Cl.
*H04L 25/03* (2006.01)
*H04B 7/185* (2006.01)

(52) U.S. Cl.
CPC ... *H04L 25/03006* (2013.01); *H04B 7/18513* (2013.01); *H04L 2025/03433* (2013.01)

(58) Field of Classification Search
CPC ...... H04B 7/18513; H04B 7/08; H04B 7/185; H04L 25/03006; H04L 2025/03433
See application file for complete search history.

(56) References Cited

U.S. PATENT DOCUMENTS

| | | | |
|---|---|---|---|
| 8,983,011 B2 * | 3/2015 | Gollakota | ............ H04J 11/0023 |
| | | | 375/345 |
| 12,316,418 B2 * | 5/2025 | Goto | .................... H04B 7/0617 |

(Continued)

FOREIGN PATENT DOCUMENTS

| | | |
|---|---|---|
| JP | 2012231229 A | 11/2012 |
| WO | WO-2021234864 A1 | 11/2021 |
| WO | WO-2021234872 A1 | 11/2021 |

OTHER PUBLICATIONS

Kazumitsu Sakamoto et al., "Capacity evaluation for each LPWA terminal in 920 MHz band IoT platform via LEO satellite", IEICE Technical Report SAT2020-35(Feb. 2021), pp. 35-40.

(Continued)

*Primary Examiner* — Dac V Ha

(57)       ABSTRACT

Each transmitting apparatus transmits the same radio signals a plurality of times. A communication apparatus includes a plurality of antennas, a signal storage unit, a reading unit, an equalization unit, and a demodulation unit. The plurality of antennas receives radio signals transmitted from a plurality of the transmitting apparatuses. The signal storage unit stores reception signals received by each of the plurality of antennas. The reading unit reads, from the signal storage unit, reception signals including radio signals transmitted from a demodulation processing target transmitting apparatus, the reception signals being received by each of the plurality of antennas at different times. The equalization unit equalizes the plurality of reception signals read by the reading unit. The demodulation unit demodulates the equalized reception signals.

13 Claims, 10 Drawing Sheets

(56)        References Cited

U.S. PATENT DOCUMENTS

| | | | |
|---|---|---|---|
| 2012/0269301 A1 | 10/2012 | Miyanaga et al. | |
| 2022/0232491 A1* | 7/2022 | Ma | H04W 48/20 |
| 2023/0170984 A1 | 6/2023 | Goto et al. | |
| 2023/0179289 A1 | 6/2023 | Goto et al. | |
| 2025/0158693 A1* | 5/2025 | Chukka | H04B 7/088 |
| 2025/0159576 A1* | 5/2025 | Han | H04W 36/26 |

OTHER PUBLICATIONS

Enrico Casini et al., "Contention Resolution Diversity Slotted ALOHA(CRDSA): An Enhanced Random Access Scheme for Satellite Access Packet Networks", IEEE transactions on wireless communications, vol. 6, No. 4, Apr. 2007, pp. 1408-1419.

* cited by examiner

| DEMODULATION PROCESSING TIMING | NUMBER | TERMINAL IDENTIFICATION INFORMATION | WEIGHT |
|---|---|---|---|
| T1 | 1 | TERMINAL #101 | W11 |
| | 2 | TERMINAL #102 | W12 |
| | ⋮ | ⋮ | ⋮ |
| | M | TERMINAL #110 | W1M |
| T2 | 1 | TERMINAL #111 | W21 |
| | 2 | TERMINAL #112 | W22 |
| | ⋮ | ⋮ | ⋮ |
| | M | TERMINAL #120 | W2M |
| ⋮ | ⋮ | ⋮ | ⋮ |

FIG. 3

| DEMODULATION PROCESSING TIMING | NUMBER | TERMINAL IDENTIFICATION INFORMATION | WEIGHT | NUMBER OF TRANSMISSIONS | RECEPTION TIME |
|---|---|---|---|---|---|
| T1 | 1 | TERMINAL #101 | W11 | 1 | T11 |
|  |  |  |  | 2 | T12 |
|  | 2 | TERMINAL #102 | W12 | 1 | T11 |
|  |  |  |  | 2 | T12 |
|  | : | : | : | : | : |
|  | M | TERMINAL #110 | W1M | 1 | T11 |
|  |  |  |  | 2 | T12 |
| T2 | 1 | TERMINAL #111 | W21 | 1 | T21 |
|  |  |  |  | 2 | T22 |
|  | 2 | TERMINAL #112 | W22 | 1 | T21 |
|  |  |  |  | 2 | T22 |
|  | : | : | : | : | : |
|  | M | TERMINAL #120 | W1M | 1 | T21 |
|  |  |  |  | 2 | T22 |
| : | : | : | : | : | : |

FIG. 6

WIRELESS COMMUNICATION SYSTEM, COMMUNICATION APPARATUS, RECEIVING APPARATUS AND WIRELESS COMMUNICATION METHOD

CROSS-REFERENCE TO RELATED APPLICATIONS

This application is a 371 U.S. National Phase of International Application No. PCT/JP2022/001755, filed on Jan. 19, 2022. The entire disclosure of the above application is incorporated herein by reference.

TECHNICAL FIELD

The present invention relates to wireless communication system, communication apparatus, receiving apparatus and wireless communication method.

BACKGROUND ART

With the development of Internet of Things (IoT) technology, it has been studied to install IoT terminals including various sensors in various places. The IoT terminals may be installed in a place where it is difficult to install a base station, such as a buoy or a ship on the sea or a mountainous area. Therefore, it is considered that data collected by IoT terminals installed in various places is relayed to a base station installed on the ground via a relay device mounted on a low earth orbit satellite.

Many IoT terminals are installed on the ground. Therefore, there is a technology in which a low earth orbit satellite receives a plurality of low power wide area (LPWA) terminal signals transmitted at the same timing with a plurality of antennas and separates the signals into signals for each terminal (see, for example, Non Patent Literature 1). As a result, it is possible to increase the number of terminals accommodated in the low earth orbit satellite. In addition, there is a technology of uniquely equalizing a signal when an inverse matrix exists even in a case where the same packet collides with a signal of another user by wireless transmission a plurality of times at different timings (see, for example, Non Patent Literature 2).

CITATION LIST

Non Patent Literature

Non Patent Literature 1: Kazumitsu Sakamoto, and 6 others, "Capacity evaluation for each LPWA terminal in 920 MHz band IoT platform via LEO satellite", IEICE Technical Report, IEICE-SAT2020-35, pp. IEICE-SAT-35-IEICE-SAT-40, February 2021
Non Patent Literature 2: Enrico Casini, Riccardo De Gaudenzi, Oscar Del Rio Herrero, "Contention Resolution Diversity Slotted ALOHA (CRDSA): An Enhanced Random Access Scheme for Satellite Access Packet Networks", IEEE Transactions on Wireless Communications, Volume 6, Issue 4, April 2007, pp. 1408-1419.

SUMMARY OF INVENTION

Technical Problem

In the technology of Non Patent Literature 1, signal multiplexing cannot be expected with a degree of freedom equal to or greater than the number of antennas of a satellite.

In addition, in the technology of Non Patent Literature 2, since an antenna of a base station is one as a premise, it is difficult to accurately receive signals simultaneously transmitted from a large number of wireless terminals.

In view of the above circumstances, it is an object of the present invention to provide wireless communication system, communication apparatus, receiving apparatus and wireless communication method capable of accurately receiving signals simultaneously transmitted from many wireless terminals.

Solution to Problem

An aspect of the present invention is a wireless communication system including a plurality of transmitting apparatuses and a communication apparatus that moves, in which the transmitting apparatus includes a transmission unit (hereinafter also referred to as "transmitter") that transmits same radio signals a plurality of times, and the communication apparatus includes a plurality of antennas that receives the radio signals transmitted from the plurality of transmitting apparatuses, a signal storage unit (hereinafter also referred to as "signal storage") that stores reception signals received by each of the plurality of antennas, a reading unit (hereinafter also referred to as "reading circuitry") that reads, from the signal storage unit, the reception signals including the radio signals transmitted from a demodulation processing target transmitting apparatus, the reception signals being received by each of the plurality of antennas at different times, an equalization unit (hereinafter also referred to as "equalizer") that equalizes a plurality of the reception signals read by the reading unit, and a demodulation unit (hereinafter also referred to as "demodulator") that demodulates the reception signals equalized by the equalization unit.

An aspect of the present invention is a wireless communication system including a plurality of transmitting apparatuses, a communication apparatus that moves, and a receiving apparatus, in which the transmitting apparatus includes a that transmits same radio signals a plurality of times, the communication apparatus includes a plurality of antennas that receives the radio signals transmitted from the plurality of transmitting apparatuses, and a waveform transmission unit (hereinafter also referred to as "waveform transmitter") that transmits waveform data indicating waveforms of reception signals received by each of the plurality of antennas to the receiving apparatus, and the receiving apparatus includes a reception unit (hereinafter also referred to as "waveform receiver") that receives the waveform data transmitted by the communication apparatus, a signal storage unit that stores the reception signals indicated by the waveform data received by the reception unit, a reading unit that reads, from the signal storage unit, the reception signals including the radio signals transmitted from a demodulation processing target transmitting apparatus, the reception signals being received by each of the plurality of antennas at different times, an that equalizes a plurality of the reception signals read by the reading unit, and a that demodulates the reception signals equalized by the equalization unit.

An aspect of the present invention is a communication apparatus in a wireless communication system including a plurality of transmitting apparatuses and the communication apparatus that moves, the communication apparatus including: a plurality of antennas that receives same radio signals for each transmitting apparatus, the radio signals being transmitted a plurality of times by each of the plurality of transmitting apparatuses; a signal storage unit that stores reception signals received by each of the plurality of antennas; a reading unit that reads, from the signal storage unit, the reception signals including the radio signals transmitted from a demodulation processing target transmitting apparatus, the reception signals being received by each of the plurality of antennas at different times; an equalization unit that equalizes a plurality of the reception signals read by the reading unit; and a demodulation unit that demodulates the reception signals equalized by the equalization unit.

An aspect of the present invention is a receiving apparatus in a wireless communication system including a plurality of transmitting apparatuses, a communication apparatus that moves, and the receiving apparatus, the receiving apparatus including: a reception unit that receives waveform data indicating waveforms of reception signals received by each of a plurality of antennas from the communication apparatus that receives same radio signals for each transmitting apparatus via the plurality of antennas, the radio signals being transmitted a plurality of times by each of the plurality of transmitting apparatuses; a signal storage unit that stores the reception signals indicated by the waveform data received by the reception unit; a reading unit that reads, from the signal storage unit, the reception signals including the radio signals transmitted from a demodulation processing target transmitting apparatus, the reception signals being received by each of the plurality of antennas at different times; an equalization unit that equalizes a plurality of the reception signals read by the reading unit; and a demodulation unit that demodulates the reception signals equalized by the equalization unit.

An aspect of the present invention is a wireless communication method executed by a wireless communication system including a plurality of transmitting apparatuses and a communication apparatus that moves, the wireless communication method including: a transmission step of transmitting same radio signals a plurality of times by the transmitting apparatus; a reception step of receiving via a plurality of antennas the radio signals transmitted from the plurality of transmitting apparatuses by the communication apparatus; a storage step of storing reception signals received by each of the plurality of antennas in a signal storage unit by the communication apparatus; a reading step of reading, from the signal storage unit, the reception signals including the radio signals transmitted from a demodulation processing target transmitting apparatus, the reception signals being received by each of the plurality of antennas at different times by the communication apparatus; an equalization step of equalizing a plurality of the reception signals read in the reading step by the communication apparatus; and a demodulation step of demodulating the reception signals equalized in the equalization step by the communication apparatus.

An aspect of the present invention is a wireless communication method executed by a wireless communication system including a plurality of transmitting apparatuses, a communication apparatus that moves, and a receiving apparatus, the wireless communication method including: a transmission step of transmitting same radio signals a plurality of times by the transmitting apparatus; a reception step of receiving via a plurality of antennas the radio signals transmitted from the plurality of transmitting apparatuses by the communication apparatus; a waveform transmission step of transmitting waveform data indicating waveforms of reception signals received by each of the plurality of antennas to the receiving apparatus by the communication apparatus; a waveform reception step of receiving the waveform data transmitted by the communication apparatus by the receiving apparatus; a storage step of storing the reception signals indicated by the waveform data received in the waveform reception step in a signal storage unit by the communication apparatus; a reading step of reading, from the signal storage unit, the reception signals including the radio signals transmitted from a demodulation processing target transmitting apparatus, the reception signals being received by each of the plurality of antennas at different times by the receiving apparatus; an equalization step of equalizing a plurality of the reception signals read in the reading step by the receiving apparatus; and a demodulation step of demodulating the reception signals equalized in the equalization step by the receiving apparatus.

An aspect of the present invention is a wireless communication method executed by a communication apparatus in a wireless communication system including a plurality of transmitting apparatuses and the communication apparatus that moves, the wireless communication method including: a reception step of receiving via a plurality of antennas same radio signals for each transmitting apparatus, the radio signals being transmitted a plurality of times by each of the plurality of transmitting apparatuses; a storage step of storing reception signals received by each of the plurality of antennas in a signal storage unit; a reading step of reading, from the signal storage unit, the reception signals including the radio signals transmitted from a demodulation processing target transmitting apparatus, the reception signals being received by each of the plurality of antennas at different times; an equalization step of equalizing a plurality of the reception signals read in the reading step; and a demodulation step of demodulating the reception signals equalized in the equalization step.

An aspect of the present invention is a wireless communication method executed by a receiving apparatus in a wireless communication system including a plurality of transmitting apparatuses, a communication apparatus that moves, and the receiving apparatus, the wireless communication method including: a waveform reception step of receiving waveform data indicating waveforms of a reception signals received by each of a plurality of antennas from the communication apparatus that receives via the plurality of antennas same radio signals for each transmitting apparatus, the radio signals being transmitted a plurality of times by each of the plurality of transmitting apparatuses; a storage step of storing the reception signals indicated by the waveform data received in the waveform reception step in a signal storage unit; a reading step of reading, from the signal storage unit, the reception signals including the radio signals transmitted from a demodulation processing target transmitting apparatus, the reception signals being received by each of the plurality of antennas at different times; an equalization step of equalizing a plurality of the reception signals read in the reading step; and a demodulation step of demodulating the reception signals equalized in the equalization step.

Advantageous Effects of Invention

According to the present invention, it is possible to accurately receive signals simultaneously transmitted from many wireless terminals.

BRIEF DESCRIPTION OF DRAWINGS

FIG. 3 is a diagram illustrating an example of demodulation processing information according to the embodiment.

FIG. 6 is a diagram illustrating an example of demodulation processing information according to the embodiment.

DESCRIPTION OF EMBODIMENTS

Figure 1:
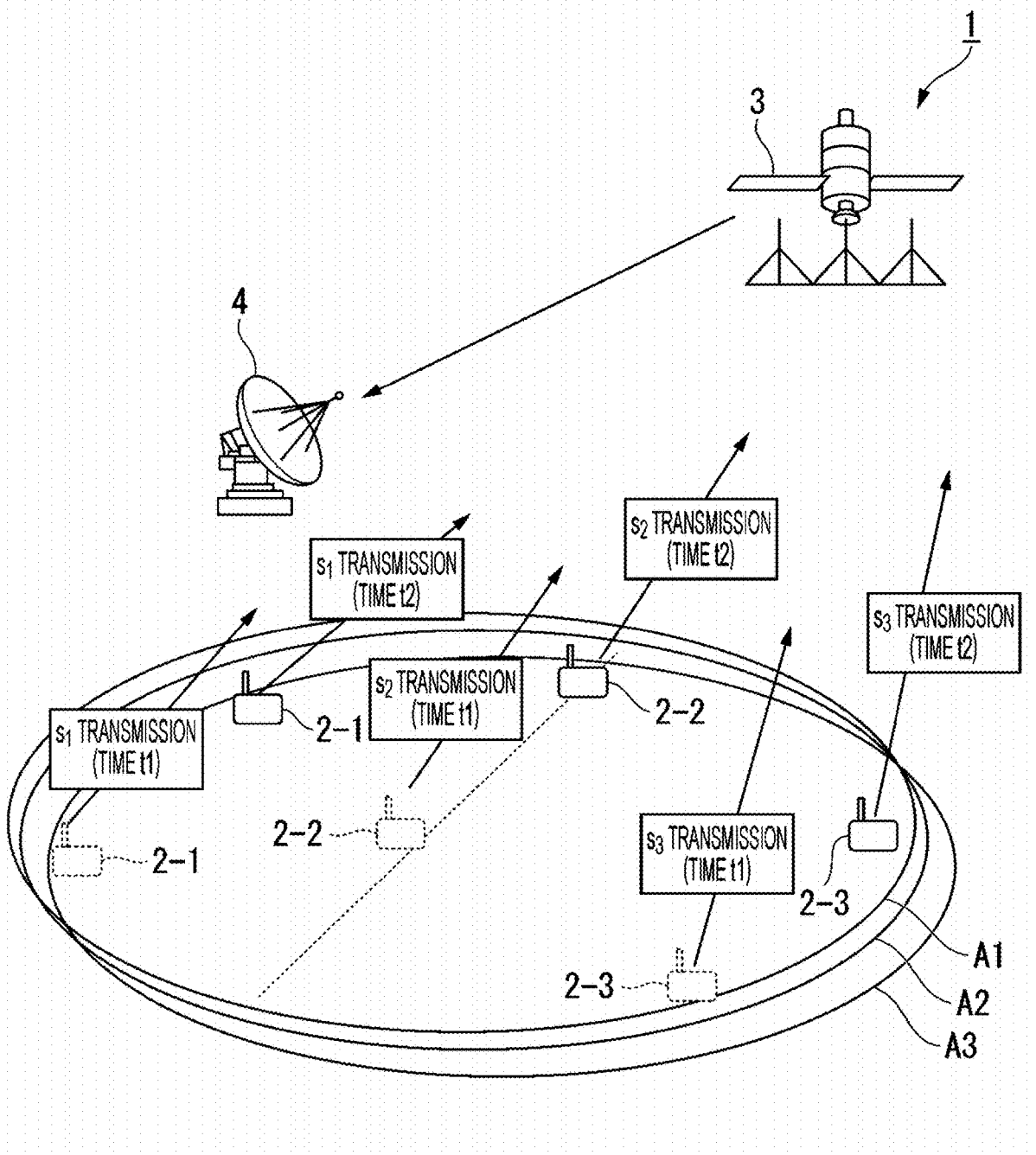
FIG. 1 is a diagram for describing a wireless communication system according to an embodiment of the present invention.

Hereinafter, embodiments of the present invention will be described in detail with reference to the drawings. In each embodiment described below, the same components as those in another embodiment are denoted by the same reference numerals, and redundant description may be omitted.

FIG. 1 is a diagram for describing an outline of a wireless communication system 1 according to an embodiment of the present invention. The wireless communication system 1 includes a terminal station 2, a mobile relay station 3, and a base station 4. The numbers of terminal stations 2, mobile relay stations 3, and base stations 4 included in the wireless communication system 1 each are arbitrary, but it is assumed that there is a large number of terminal stations 2.

The terminal station 2 is, for example, an IoT terminal. The mobile relay station 3 is an example of a communication apparatus that is mounted on a moving body and whose communicable area moves with the lapse of time. The mobile relay station 3 of the present embodiment is provided in a low earth orbit (LEO) satellite. The LEO satellite has an altitude of 2000 km or less and moves around the earth once every about 1.5 hours. The terminal station 2 and the base station 4 are installed on the earth such as on the ground or on the sea. A radio signal from the terminal station 2 to the mobile relay station 3 will be referred to as a terminal uplink signal, a radio signal from the mobile relay station 3 to the base station 4 will be referred to as a base station downlink signal.

Since the mobile relay station 3 mounted on the LEO satellite performs communication while moving at a high speed, a time during which each terminal station 2 or the base station 4 can communicate with the mobile relay station 3 is limited. Specifically, when viewed on the ground, the mobile relay station 3 passes through the sky in about several minutes. Therefore, the terminal station 2 collects and stores data such as environmental data detected by a sensor. The terminal station 2 transmits a terminal uplink signal in which the collected data is set at a timing at which communication with the mobile relay station 3 is possible. The mobile relay station 3 receives the terminal uplink signal transmitted from each of the plurality of terminal stations 2 while moving above the earth. The mobile relay station 3 accumulates data received from each terminal station 2 via the terminal uplink signal and wirelessly transmits the accumulated data to the base station 4 via a base station downlink signal at a timing at which communication with the base station 4 is possible. The base station 4 acquires the data collected by the terminal station 2 from the received base station downlink signal.

The mobile relay station 3 includes an antenna used for wireless communication with the terminal station 2 and an antenna used for wireless communication with the base station 4. Thus, the mobile relay station 3 can perform wireless communication with the terminal station 2 and wireless communication with the base station 4 in parallel.

As the mobile relay station, it is conceivable to use a relay station mounted on a geostationary satellite, or an unmanned aerial vehicle such as a drone or a high altitude platform station (HAPS). However, a relay station mounted on a geostationary satellite has a wide coverage area (footprint) on the ground, but has a very small link budget with respect to IoT terminals installed on the ground because its altitude is high. On the other hand, in the case of a relay station mounted on a drone or a HAPS, the link budget is high, but the coverage area is small. Furthermore, the drone requires a battery, and the HAPS requires a solar panel. In the present embodiment, the mobile relay station 3 is mounted on a LEO satellite.

Thus, the link budget falls within a limit, and, in addition, the LEO satellite has no air resistance and has low fuel consumption because the LEO satellite moves around the outside of the atmosphere. In addition, the footprint is larger than that in the case of the relay station mounted on the drone or the HAPS.

However, as described above, the mobile relay station 3 mounted on the LEO satellite has a smaller link budget than the relay station mounted on the drone or HAPS. Therefore, the mobile relay station 3 of the present embodiment basically performs interference compensation for detecting an original signal by performing signal processing on reception signals of a plurality of antennas at a certain time. Specifically, the mobile relay station 3 receives the terminal uplink signal by multiple input multiple output (MIMO) using a plurality of antennas. Furthermore, each terminal station 2 transmits the same terminal uplink signal a plurality of times at different timings. As a result, the number of possibilities of the terminal uplink signal that can be received by the mobile relay station 3 can be increased, and the demodulation accuracy can be improved. In addition, as the transmission location, time, and the like are separated, the correlation of channel components becomes lower, and the separation performance is improved. Thus, by allowing the terminal station 2 as much time as possible for the transmission timing of the same terminal uplink signal, it is possible to improve the separation performance in the mobile relay station 3.

For example, the mobile relay station 3 receives the terminal uplink signal transmitted from each of M terminal stations 2 (M is an integer of 2 or more) at time t1 to time tK (K is an integer of 2 or more) with N antennas (N is an integer of 2 or more). The N antennas of the mobile relay station 3 are referred to as antennas #1 to #N, the M terminal stations 2 are referred to as terminal stations 2-1 to 2-M, and the terminal uplink signal transmitted by a terminal station 2-$m$ (m is an integer of 1 or more and M or less) is referred to as $s_m$. FIG. 1 illustrates an example of a case where N=3, M=3, and K=2. Since the mobile relay station 3 is moving, the relative position of the terminal station 2 viewed from the mobile relay station 3 changes with time. FIG. 1 illustrates terminal stations 2-1 to 2-3 at relative positions as viewed from the mobile relay station 3 at time t1 and time t2. In addition, area An (n is an integer of 1 or more and N or less) is the beam coverage of an antenna #n of the mobile relay station 3 at time t2.

When each terminal station 2-*m* transmits the same terminal uplink signal $s_m$ at K different timings, the antenna #n receives a signal $r_{(k-1)N+n}$ at time tk (k is an integer of 1 or more and K or less). A relationship between the terminal uplink signal $s_m$ and the signal $r_{(k-1)N+n}$ received by the antenna #n is indicated by a MIMO matrix in Formula (1) described below.

[Math. 1]

$$\begin{pmatrix} r_1 \\ \vdots \\ r_N \\ r_{N+1} \\ \vdots \\ r_{2N} \\ \vdots \\ r_{(K-1)N+1} \\ \vdots \\ r_{KN} \end{pmatrix} = \begin{pmatrix} h_{1,1} & h_{1,2} & \cdots & h_{1M} \\ \vdots & \vdots & & \vdots \\ h_{N,1} & h_{N,2} & \cdots & h_{N,M} \\ h_{N+1,1} & h_{N+1,2} & \cdots & h_{N+1,M} \\ \vdots & \vdots & & \vdots \\ h_{2N,1} & h_{2N,2} & \cdots & h_{2N,M} \\ \vdots & \vdots & & \vdots \\ h_{(K-1)N+1,1} & h_{(K-1)N+1,2} & \cdots & h_{(K-1)N+1,M} \\ \vdots & \vdots & & \vdots \\ h_{KN,1} & h_{KN,2} & \cdots & h_{KN,M} \end{pmatrix} \begin{pmatrix} s_1 \\ s_2 \\ \vdots \\ s_M \end{pmatrix} \quad (1)$$

The matrix before $(s_1, \ldots, s_M)^T$ on the right side of Formula (1) indicates the path gain (T on the right shoulder indicates transposition). Note that, in the following, for convenience, the matrix and the transposed matrix will be described without distinction.

For example, in the case of FIG. 1, the terminal station 2-1 transmits terminal uplink signal $s_1$ at time t1 and time t2, the terminal station 2-2 transmits terminal uplink signal $s_2$ at time t1 and time t2, and the terminal station 2-3 transmits terminal uplink signal $s_3$ at time t1 and time t2. The antenna #1 of the mobile relay station 3 receives signal $r_1$ at time t1 and signal $r_4$ at time t2, the antenna #2 receives signal $r_2$ at time t1 and signal $r_5$ at time t2, and the antenna #3 receives signal $r_3$ at time t1 and signal $r_6$ at time t2. The signals $r_1$ to $r_6$ are signals on which the terminal uplink signals $s_1$, $s_2$, and $s_3$ are superimposed. A relationship between the terminal uplink signals $s_1$ to $s_3$ and the signals $r_1$ to $r_6$ is indicated by a MIMO matrix in Formula (2) described below on the basis of Formula (1).

[Math. 2]

$$\begin{pmatrix} r_1 \\ r_2 \\ r_3 \\ r_4 \\ r_5 \\ r_6 \end{pmatrix} = \begin{pmatrix} h_{1,1} & h_{1,2} & h_{1,3} \\ h_{2,1} & h_{2,2} & h_{2,3} \\ h_{3,1} & h_{3,2} & h_{3,3} \\ h_{4,1} & h_{4,2} & h_{4,3} \\ h_{5,1} & h_{5,2} & h_{5,3} \\ h_{6,1} & h_{6,2} & h_{6,3} \end{pmatrix} \begin{pmatrix} s_1 \\ s_2 \\ s_3 \end{pmatrix} \quad (2)$$

Note that when each of the terminal stations 2-1 to 2-3 transmits the first signal at different times t1, t1', and t1", instead of $r_1$ to $r_3$ in Formula (2), signals $r_1$ to $r_3$ received by the antennas #1 to #3 at time t1, signals $r_1$' to $r_3$' received at time t1', and signals $r_1$" to $r_3$" received at time t1" are used.

The mobile relay station 3 needs to recognize that the signals $r_1$ to $r_6$ include the same terminal uplink signals respectively transmitted by the terminal stations 2-1 to 2-3 among the signals received while moving. Therefore, for example, each terminal station 2 sets, in the terminal uplink signal, the identification information of the terminal station 2 and the header information from which the number of repetitive transmissions, the transmission timing, or the like of the terminal uplink signal can be acquired, using a spreading code or the like. By using the spreading code, even when the terminal uplink signals are received in an overlapping manner, the header information can be read. Alternatively, when the number of repetitive transmissions and the transmission time of the terminal uplink signal transmitted by the terminal station 2 are determined in advance, the mobile relay station 3 obtains signals $r_1$ to $r_6$ including the terminal uplink signals $s_1$ to $s_3$ respectively transmitted from the terminal stations 2-1 to 2-3 on the basis of the information.

A weight for obtaining the terminal uplink signals $s_1$ to $s_3$ from the signals $r_1$ to $r_6$ can be calculated on the basis of Formula (2) described above. The mobile relay station 3 performs MIMO equalization on the terminal uplink signals $s_1$ to $s_3$ by multiplying the signals $r_1$ to $r_6$ by a weight calculated in advance. The mobile relay station 3 demodulates the MIMO-equalized terminal uplink signal $s_m$ to obtain data transmitted by the terminal station 2-*m*. Note that the mobile relay station 3 may transmit the waveform data of the signal received by each of the antennas #1 to #N to the base station 4. The base station 4 restores the signals $r_1$ to $r_6$ from the waveform data, and performs MIMO equalization and demodulation using the restored signals.

Hereinafter, detailed embodiments of the wireless communication system 1 will be described.

First Embodiment

In the present embodiment, a mobile relay station demodulates a terminal uplink signal.

Figure 2:
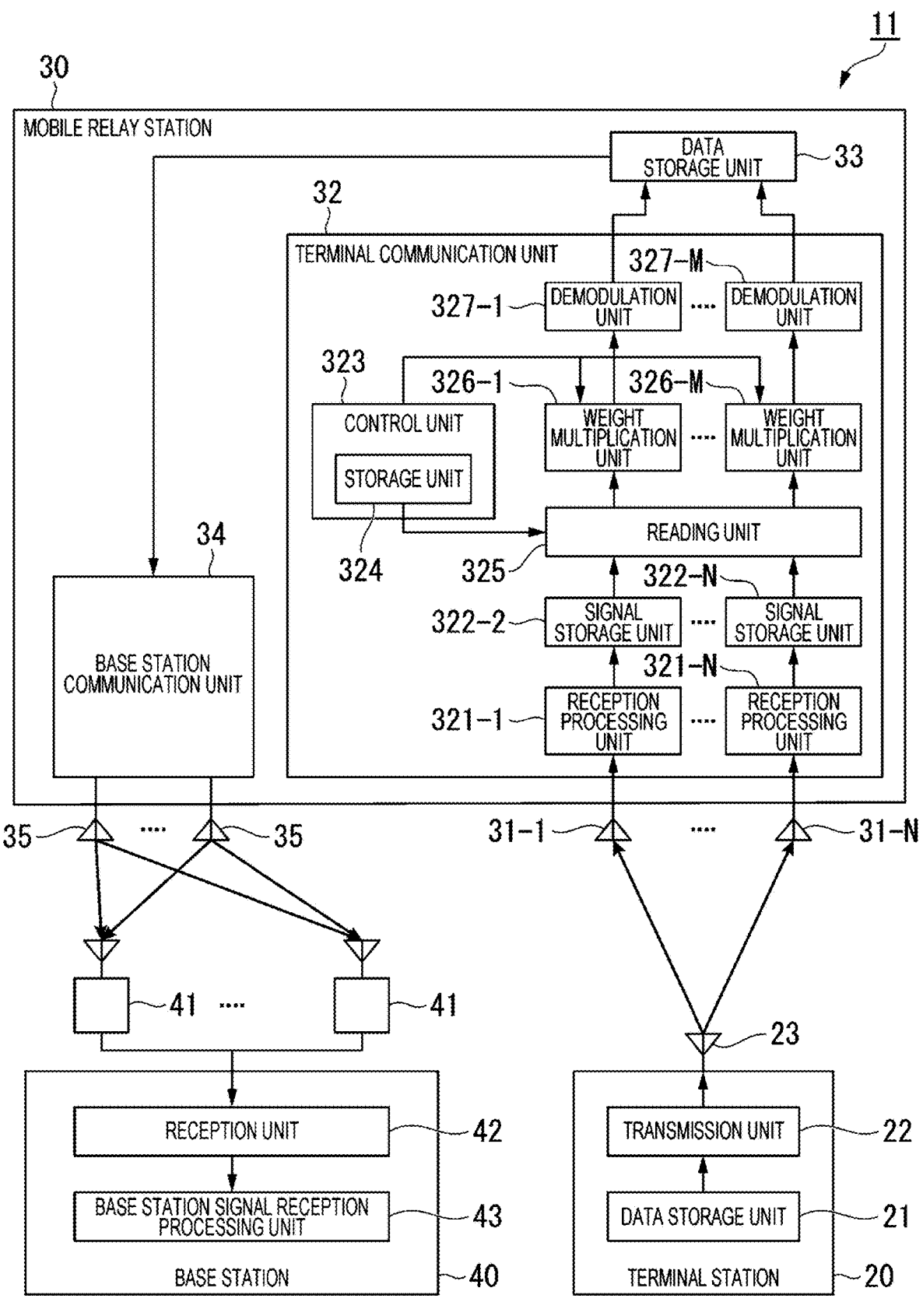
FIG. 2 is a configuration diagram of a wireless communication system according to a first embodiment.

FIG. 2 is a configuration diagram of a wireless communication system 11 according to the first embodiment. In FIG. 2, only functional blocks related to the present embodiment are extracted and illustrated. The wireless communication system 11 includes a terminal station 20, a mobile relay station 30, and a base station 40. The terminal station 20 is used as the terminal station 2 in FIG. 1, the mobile relay station 30 is used as the mobile relay station 3 in FIG. 1, and the base station 40 is used as the base station 4 in FIG. 1.

The terminal station 20 includes a data storage unit 21, a transmission unit 22, and one or a plurality of antennas 23. The data storage unit 21 stores environmental data detected by a sensor. The transmission unit 22 reads the environmental data from the data storage unit 21 as terminal transmission data and wirelessly transmits a terminal uplink signal in which the read terminal transmission data is set via the antennas 23.

The transmission unit 22 transmits a signal using the same frequency band as that of another terminal station 20 by LPWA, for example. In addition, the transmission unit 22 transmits the same terminal uplink signal a plurality of times at different timings. The transmission unit 22 sets the terminal identification information, the transmission time, the number of transmissions, and the total number of transmissions in the header information of the terminal uplink signal by using a spreading code or the like. The terminal identification information is information for specifying the terminal station 20. The number of transmissions indicates k-th (k is an integer of 1 or more and K or less) transmission among the total number of transmissions K (K is an integer of 2 or more) of the same terminal uplink signal. When the reception time in the mobile relay station 30 is set as the transmission time, setting of the transmission time may be omitted.

The mobile relay station 30 includes antennas 31-1 to 31-N (N is an integer of 2 or more), a terminal communication unit 32, a data storage unit 33, a base station communication unit 34, and one or more antennas 35.

The terminal communication unit 32 performs wireless communication with the terminal station 20. The terminal communication unit 32 includes reception processing units 321-1 to 321-N, signal storage units 322-1 to 322-N, a control unit 323, a reading unit 325, weight multiplication units 326-1 to 326-M, and demodulation units 327-1 to 327-M.

The reception processing unit 321-*n* (n is an integer of 1 or more and N or less) receives the terminal uplink signal transmitted from each terminal station 20 via the antenna 31-*n*. The reception processing unit 321-*n* down-converts the reception signal from the antenna 31-*n*. As a result, the reception signal is frequency-converted from a radio frequency (RF) signal to a baseband signal. Before the down-conversion, the reception processing unit 321-*n* may perform amplification using a low noise amplifier (LNA), extraction of a predetermined band using a band pass filter (BPF), and the like on the reception signal. The reception processing unit 321-*n* converts the down-converted reception signal from an analog signal to a digital signal, and then performs fast Fourier transform (FFT) on the reception signal. The reception processing unit 321-*n* writes the reception signal on which the FFT has been performed into the signal storage unit 322-*n*. The signal storage unit 322-*n* stores time-series reception signals received by the antenna 31-*n*.

The control unit 323 controls the reading unit 325 and the weight multiplication units 326-1 to 326-M. The control unit 323 includes a storage unit 324. The storage unit 324 stores demodulation processing information. The demodulation processing information is information in which the demodulation processing timing, the terminal identification information of a demodulation processing target terminal station 20 at the demodulation processing timing, and the weight of each demodulation processing target terminal station 20 are associated with each other. The demodulation processing target terminal station 20 is referred to as a processing target terminal station 20. The upper limit of the number of the processing target terminal stations 20 at each demodulation processing timing is M. The M processing target terminal stations 20 at the demodulation processing timing are referred to as processing target terminal stations 20-1 to 20-M. Although there is a large number of terminal stations 20 on the ground, the terminal stations 20 to be the processing target terminal stations 20-1 to 20-M are switched depending on the demodulation processing timing. The demodulation processing timing is indicated by, for example, time. The demodulation processing information is set in advance on the basis of the orbit information indicating the position of the LEO equipped with the mobile relay station 30 at each time, the position of each terminal station 20, and the information of the time at which each terminal station 20 transmits the terminal uplink signal. The weight set in the demodulation processing information is a weight for performing MIMO equalization on the reception signals of the antennas 31-1 to 31-N at different times to obtain terminal uplink signal s_*m* of the processing target terminal station 20-*m*. This weight is calculated on the basis of Formula (1) and a matrix indicating the path gain obtained in advance.

The control unit 323 specifies the demodulation processing timing set in the demodulation processing information on the basis of the current time. The control unit 323 reads the terminal identification information of the processing target terminal station 20-*m* (m is an integer of 1 or more and M or less) corresponding to the specified demodulation processing timing and the weight of the processing target terminal station 20-*m*. The control unit 323 notifies the reading unit 325 of the terminal identification information of the processing target terminal stations 20-1 to 20-M, and notifies each weight multiplication unit 326-*m* of the weight of the processing target terminal station 20-*m*.

The reading unit 325 receives the terminal identification information of the processing target terminal stations 20-1 to 20-M from the control unit 323. The reading unit 325 reads the terminal identification information, the transmission time, the number of transmissions, and the total number of transmissions set in the header of the terminal uplink signal from the reception signal received by time a predetermined time before the current time among the reception signals stored in the signal storage units 322-1 to 322-N. The reading unit 325 reads the reception signal including the terminal uplink signal in which the terminal identification information of the processing target terminal station 20-*m* is set from the signal storage units 322-1 to 322-N, and outputs the reception signal to the weight multiplication unit 326-*m*. The reading unit 325 adds antenna identification information of the antenna 31-*n* that has received the reception signal and the information of the header read from the terminal uplink signal of the processing target terminal station 20-*m* to each reception signal output to the weight multiplication unit 326-*m*.

The weight multiplication unit 326-*m* operates as an equalization unit that performs MIMO equalization. The reception signal is received from the reading unit 325. The weight multiplication unit 326-*m* determines which of the signals $r_1, \ldots,$ and $r_{KN}$ each reception signal corresponds to on the basis of the antenna identification information added to the reception signal, and the header information. Specifically, the weight multiplication unit 326-*m* arranges the reception signals in descending order of the transmission time and in ascending order of the antenna identification information. The number of transmissions may be used instead of the transmission time. In this case, the weight multiplication unit 326-*m* arranges the reception signals in ascending order of the number of transmissions and in ascending order of the antenna identification information. The weight multiplication unit 326-*m* multiplies the reception signals corresponding to the signals $r_1, \ldots,$ and $r_{KN}$ by the weight received from the control unit 323 to calculate the terminal uplink signal s_*m* of the processing target terminal station 20-*m*. The weight multiplication unit 326-*m* outputs the terminal uplink signal s_*m* of the processing target terminal station 20-*m* to the demodulation unit 327-*m*.

The demodulation unit 327-*m* detects a frame of the terminal uplink signal s_*m* of the processing target terminal station 20-*m*, and performs demodulation and decoding to obtain the terminal transmission data. The demodulation unit 327-*m* writes the terminal identification information of the processing target terminal station 20-*m*, the terminal transmission data, and the transmission time in the data storage unit 33 in association with each other. The transmission time may be a transmission time of the terminal uplink signal transmitted at a predetermined time, such as the first time or the last time, among the terminal uplink signals transmitted K times, or may be a transmission time of each terminal uplink signal.

The data storage unit 33 stores the terminal identification information, the transmission time, and the terminal transmission data in association with each other. The base station communication unit 34 reads the terminal transmission data to which the terminal identification information and the transmission time are added from the data storage unit 33 as transmission data to the base station 40. The base station communication unit 34 encodes and modulates the transmission data and generates a base station downlink signal. The base station communication unit 34 transmits the base station downlink signal from the antenna 35.

The base station 40 includes one or more antenna stations 41, a reception unit 42, and a base station signal reception processing unit 43. Here, a case where the base station 40 includes a plurality of antenna stations 41 will be described as an example.

The antenna station 41 converts the base station downlink signal received from the mobile relay station 3 into an electric signal and outputs the electric signal to the reception unit 42. The reception unit 42 multiplies the base station downlink signal input from each antenna station 41 by the weight corresponding to the reception time of the base station downlink signal and combines the reception signals multiplied by the weights. The base station signal reception processing unit 43 demodulates and decodes the combined reception signals to obtain the terminal transmission data to which the terminal identification information and the transmission time are added.

FIG. 3 is a diagram illustrating an example of demodulation processing information stored in the storage unit 324 of the mobile relay station 30. The demodulation processing information illustrated in FIG. 3 is information in which the demodulation processing timing, the number, the terminal identification information of the processing target terminal station 20, and the weight are associated with each other. The number indicates the number among the M processing target terminal stations 20 that can be processed at each demodulation processing timing. The terminal station 20 specified by the terminal identification information corresponding to the number m corresponds to the processing target terminal station 20-*m*.

Operation of the wireless communication system 11 will be described.

Figure 4:
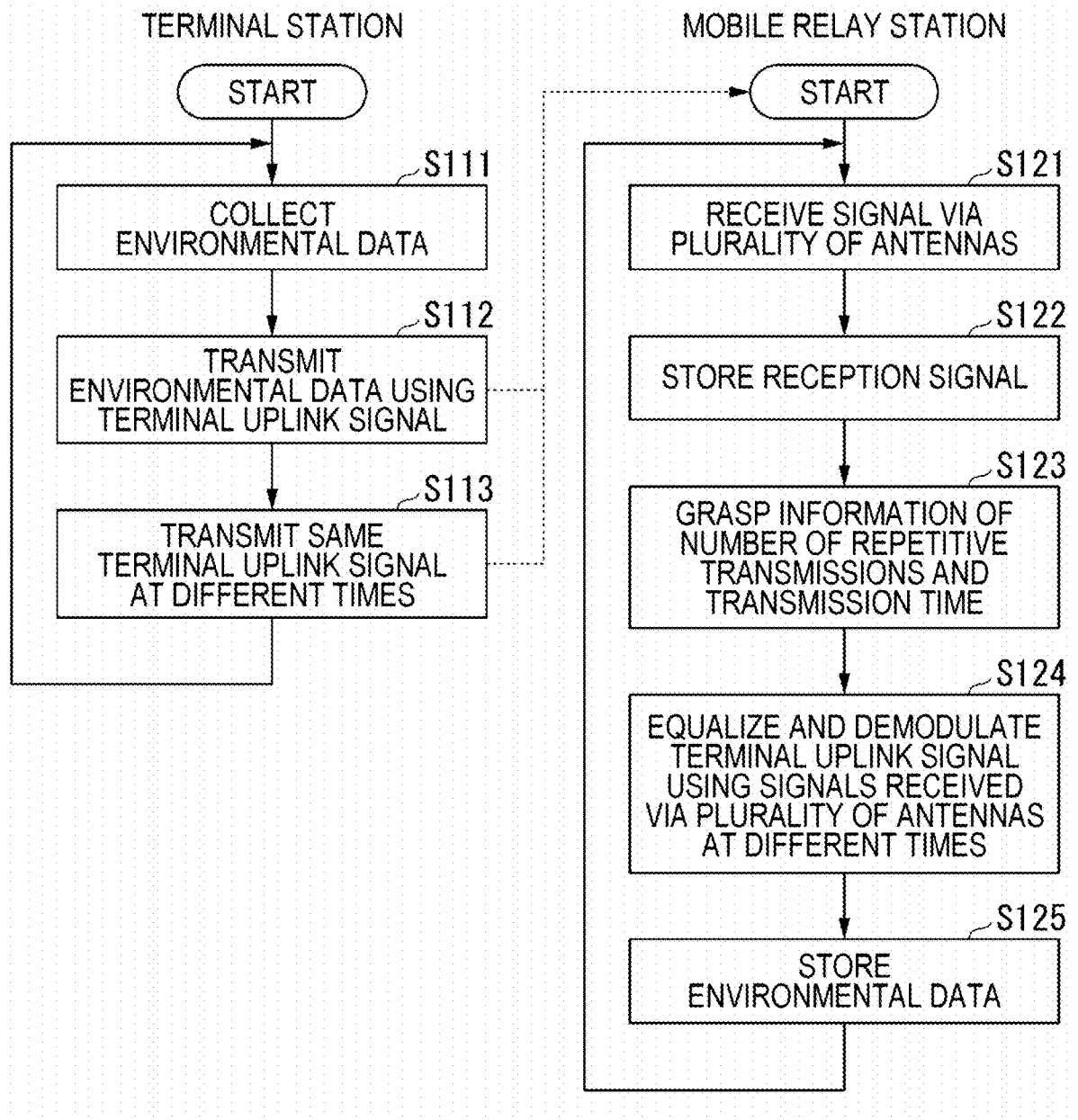
FIG. 4 is a flowchart illustrating processing of the wireless communication system according to the embodiment.

FIG. 4 is a flowchart illustrating operation of the wireless communication system 11 in a case where a terminal uplink signal is transmitted from the terminal station 20. The terminal station 20 acquires environmental data detected by a sensor, which is not illustrated, provided outside or inside as necessary and writes the acquired environmental data to the data storage unit 33 (step S111).

The transmission unit 22 detects that it is the transmission start timing obtained in advance on the basis of the orbit information of the LEO satellite equipped with the mobile relay station 30. Alternatively, the transmission unit 22 may determine that it is the transmission start timing when receiving a beacon transmitted by the mobile relay station 30. The transmission unit 22 reads the environmental data from the data storage unit 21 as the terminal transmission data. The transmission unit 22 generates a terminal uplink signal in which the read terminal transmission data is set. The transmission unit 22 sets the terminal identification information, the transmission time, the number of transmissions, and the total number of transmissions in the header information of the terminal uplink signal by using a spreading code or the like. The transmission unit 22 wirelessly transmits the terminal uplink signals via the antennas 23 (step S112). The transmission unit 22 transmits the terminal uplink signal transmitted in step S112 once or a plurality of times at different times (step S113). The terminal station 20 repeats the processing from step S111.

The antennas 31-1 to 31-N of the mobile relay station 30 receive the terminal uplink signal transmitted from the terminal station 20 in step S112 or step S113 (step S121). The reception processing units 321-1 to 321-N each down-convert the reception signals from the antennas 31-1 to 31-N and then convert analog signals into digital signals. The reception processing units 321-1 to 321-N perform the FFT on the reception signals converted into the digital signals. The reception processing units 321-1 to 321-N each write the reception signal on which the FFT has been performed into the signal storage units 322-1 to 322-N (step S122).

The control unit 323 reads the terminal identification information and the weight of each of the processing target terminal stations 20-1 to 20-M corresponding to the demodulation processing timing to which the current time is set from the demodulation processing information. The control unit 323 notifies the reading unit 325 of the terminal identification information of the processing target terminal stations 20-1 to 20-M. Further, the control unit 323 notifies each of the weight multiplication units 326-1 to 326-M of the weights of the processing target terminal stations 20-1 to 20-M.

The reading unit 325 reads the header of the terminal uplink signal from the reception signal received by time a predetermined time before the current time among the reception signals stored in the signal storage units 322-1 to 322-N. The reading unit 325 specifies the reception signal including the terminal uplink signal in which the terminal identification information of each processing target terminal station 20-*m* is set in the header and reads the specified reception signal from the signal storage units 322-1 to 322-N, and outputs the specified reception signal to the weight multiplication unit 326-*m*. The reading unit 325 adds the antenna identification information of the antenna 31-*n* that has received the reception signal and the information of the header of the terminal uplink signal included in the reception signal to each reception signal output to the weight multiplication unit 326-*m* (step S123). Note that the reading unit 325 may add the reception time at the antenna 31-*n* to the reception signal.

Each of the weight multiplication units 326-1 to 326-M receives the reception signal from the reading unit 325. The weight multiplication unit 326-*m* arranges the reception signals on the basis of the antenna identification information added to the reception signals and the transmission time, the number of transmissions, and the total number of transmissions indicated by the information of the header added to the reception signals. The weight multiplication unit 326-*m* may use the reception time added to the reception signal instead of the transmission time indicated by the information of the header. The weight multiplication unit 326-*m* multiplies the arranged reception signals by the weight received from the control unit 323 to perform MIMO equalization, thereby obtaining a terminal uplink signal of the processing target terminal station 20-*m*.

For example, it is assumed that the number M of the processing target terminal stations 20 is three and the total number of transmissions is two. The control unit 323 reads the terminal identification information and the weight of each of the processing target terminal stations 20-1 to 20-3 corresponding to the demodulation processing timing to which current time t is set from the demodulation processing information. The control unit 323 notifies the reading unit 325 of the terminal identification information of the processing target terminal stations 20-1 to 20-3 and notifies the weight multiplication units 326-1 to 326-3 of the respective weights of the processing target terminal stations 20-1 to 20-3. The reading unit 325 outputs the signal $r_1$ at transmission time t1 and the signal $r_4$ at transmission time t2 read from the signal storage unit 322-1, the signal $r_2$ at transmission time t1 and the signal $r_5$ at transmission time t2 read from the signal storage unit 322-2, and the signal $r_3$ at transmission time t1 and the signal $r_6$ at the transmission time t2 read from the signal storage unit 322-3 to each of the weight multiplication units 326-1 to 326-3 (t1<t2<t). The weight multiplication unit 326-1 multiplies $(r_1, r_2, \ldots, r_6)$ by the weight of the processing target terminal station 20-1 to calculate the terminal uplink signal $s_1$, multiplies $(r_1, r_2, \ldots, r_6)$ by the weight of the processing target terminal station 20-2 to calculate the terminal uplink signal $s_2$, and multiplies $(r_1, r_2, \ldots, r_6)$ by the weight of the processing target terminal station 20-3 to calculate the terminal uplink signal $s_3$.

The demodulation units 327-1 to 327-M each detect frames of the terminal uplink signals on which the MIMO equalization has been performed by the weight multiplication units 326-1 to 326-M, and demodulate and decode the detected frames to obtain environmental data, which is terminal transmission data (step S124). Each demodulation unit 327-$m$ writes the terminal identification information and the transmission time of the processing target terminal station 20-$m$ in the data storage unit 33 in association with the environmental data obtained from the terminal uplink signal $s_m$ in step S124 (step S125). The data storage unit 33 stores the environmental data acquired by each of the demodulation units 327-1 to 327-M. The mobile relay station 30 repeats the processing from step S121.

Figure 5:
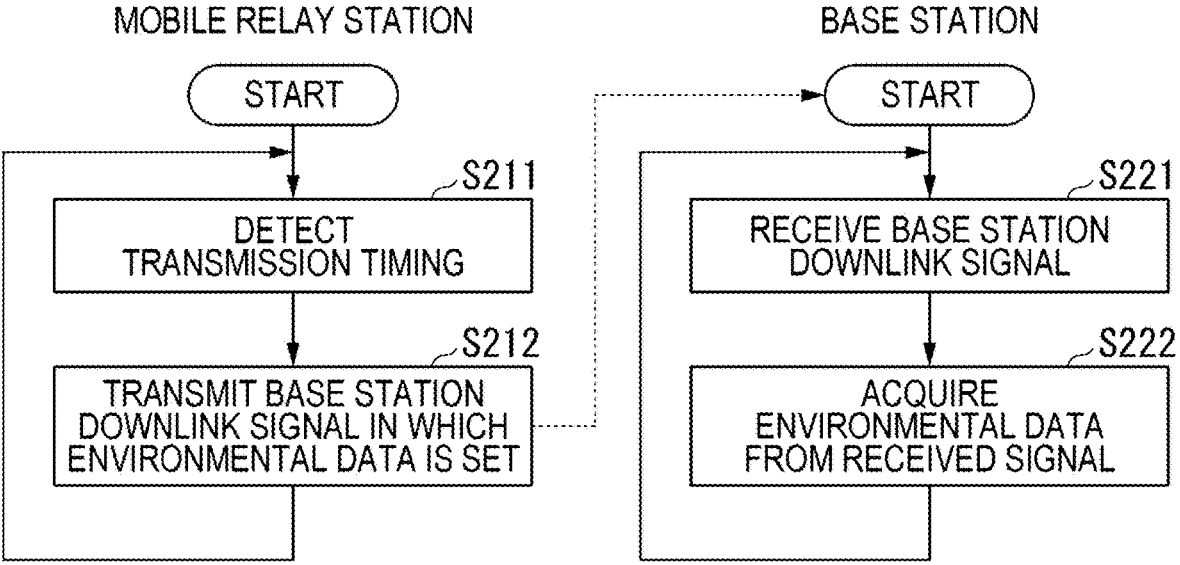
FIG. 5 is a flowchart illustrating processing of the wireless communication system according to the embodiment.

FIG. 5 is a flowchart illustrating processing of the wireless communication system 11 in a case where a base station downlink signal is transmitted from the mobile relay station 30. The base station communication unit 34 of the mobile relay station 30 detects that it is the transmission start timing stored in advance (step S211). The base station communication unit 34 reads the environmental data to which the terminal identification information and the transmission time are added from the data storage unit 33 as transmission data, and generates a base station downlink signal in which the read transmission data is set. The base station communication unit 34 transmits the generated base station downlink signal via the antennas 35 (step S212). The mobile relay station 30 repeats the processing from step S211.

The base station 40 receives the base station downlink signal from the mobile relay station 30 (step S221). That is, each antenna station 41 converts the base station downlink signal received from the mobile relay station 30 into an electric signal. The reception unit 42 synchronizes the timings of the reception signals received from the respective antenna stations 41, and multiplies the reception signals by the weight and adds the reception signals. The base station signal reception processing unit 43 demodulates the added reception signals and decodes the demodulated reception signals to obtain the environmental data (step S222). The base station 40 repeats the processing from step S221.

In the above description, the terminal communication unit 32 of the mobile relay station 30 specifies the reception signal including the terminal uplink signal of the processing target terminal station 20-$m$ by using the header information set in the terminal uplink signal. However, on the basis of the position and the transmission timing of the terminal station 20 and the orbit information of the LEO equipped with the mobile relay station 30, it is possible to calculate in advance the time at which the mobile relay station 30 receives the terminal uplink signal of each terminal station 20 via each of the antennas 31-1 to 31-N. Therefore, the storage unit 324 may store the demodulation processing information illustrated in FIG. 6 instead of the demodulation processing information illustrated in FIG. 3.

FIG. 6 is a diagram illustrating an example of demodulation processing information. The demodulation processing information illustrated in FIG. 6 is information in which the demodulation processing timing, the number, the terminal identification information of the processing target terminal station 20, the weight, and the set of the number of transmissions of the terminal uplink signal from the processing target terminal station 20 and the reception time of the terminal uplink signal in the mobile relay station 30 are associated with each other. FIG. 6 illustrates a case where the total number of transmissions from each terminal station 20 is two, but the total number of transmissions may be arbitrary. In addition, the total number of transmissions and the reception time may be different for each terminal station 20. Note that the demodulation processing timing is time later than the corresponding reception time.

In this case, the terminal station 20 may not set a header using a spreading code or the like in the terminal uplink signal transmitted in step S112 of FIG. 4. In addition, in step S123 of FIG. 4, the control unit 323 of the mobile relay station 30 reads the terminal identification information and the weight of each of the processing target terminal stations 20-1 to 20-M corresponding to the demodulation processing timing to which the current time is set, and the set of the number of transmissions and the reception time from the demodulation processing information. The control unit 323 notifies the reading unit 325 of the terminal identification information of each of the processing target terminal stations 20-1 to 20-M and the set of the number of transmissions and the reception time. The control unit 323 notifies each of the weight multiplication units 326-1 to 326-M of the weights of the processing target terminal stations 20-1 to 20-M as described above.

The reading unit 325 reads the reception signal at the reception time corresponding to the processing target terminal station 20-$m$ from the signal storage units 322-1 to 322-N for each processing target terminal station 20-$m$. The reading unit 325 adds the antenna identification information of the antenna 31-$n$ that has received the reception signal and the reception time and the number of transmissions of the reception signal to each reception signal read for the processing target terminal station 20-$m$, and outputs the reception signal to the weight multiplication unit 326-$m$. The processing of step S124 and subsequent steps of the mobile relay station 30 is similar to the above.

In the above description, the terminal communication unit 32 of the mobile relay station 30 includes M weight multiplication units of the weight multiplication units 326-1 to 326-M and M demodulation units of the demodulation units 327-1 to 327-M. However, in a case where a part or the whole of the processing for the processing target terminal stations 20-1 to 20-M at the same demodulation processing timing is sequentially performed, the terminal communication unit 32 may include fewer than M weight multiplication units and demodulation units.

As described above, the mobile relay station 30 receives the terminal uplink signals of the same frequency band from the plurality of terminal stations 20 in a service area via the plurality of antennas 31-1 to 31-N. The terminal station 20 retransmits the same terminal uplink signal at another timing to improve reliability. The mobile relay station 30 demodulates the terminal uplink signal of each terminal station 20 from the reception signal and aggregates the obtained environmental data. When the terminal stations 20 transmit the terminal uplink signals at the same timing, interference occurs and demodulation performance deteriorates. Therefore, the mobile relay station 30 performs MIMO equalization using a plurality of reception signals received via the plurality of antennas 31-1 to 31-N at different timings, thereby improving equalization characteristics and reducing interference. In addition, the possibilities of the reception signal used to perform the MIMO equalization include not only reception signals at the same timing but also reception signals at repetitive transmission timings. As a result, the number of possibilities for the reception signal can be increased, and the equalization characteristics are improved. In addition, since the time when the terminal station 20 transmits the terminal uplink signal and the position of the terminal station 20 as viewed from the mobile relay station 30 are separated, the separation performance in the mobile relay station 30 is improved. Thus, the mobile relay station 30 can accurately receive signals simultaneously transmitted from many terminal stations 20.

Second Embodiment

In the second embodiment, a base station demodulates a terminal uplink signal. Therefore, a mobile relay station stores waveform data obtained by sampling the waveform of the reception signal of each antenna. The mobile relay station wirelessly transmits a base station downlink signal in which the stored waveform data is set to the base station at a timing at which the base station exists in the coverage. The base station obtains the waveform data by demodulating the base station downlink signal received from the mobile relay station. The base station performs signal processing similar to that of the terminal communication unit 32 of the mobile relay station 30 of the first embodiment on the reception signal indicated by the waveform data, thereby obtaining terminal transmission data transmitted by a terminal station. The present embodiment will be described focusing on a difference from the first embodiment.

Figure 7:
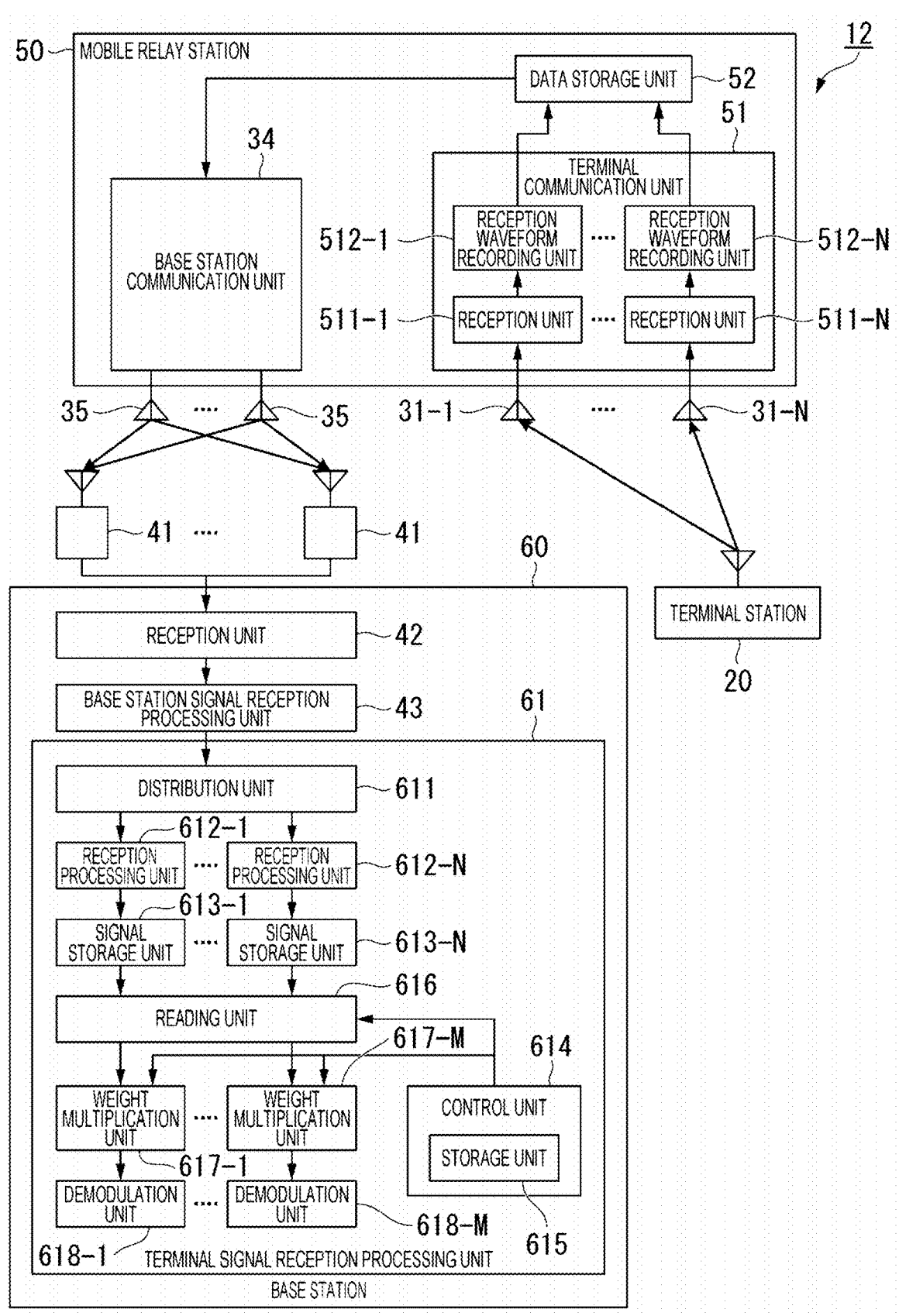
FIG. 7 is a configuration diagram of a wireless communication system according to a second embodiment.

FIG. 7 is a configuration diagram of a wireless communication system 12 according to the second embodiment. The wireless communication system 12 includes a terminal station 20, a mobile relay station 50, and a base station 60. The mobile relay station 50 is used as the mobile relay station 3 in FIG. 1, and the base station 60 is used as the base station 4 in FIG. 1.

The mobile relay station 50 illustrated in FIG. 7 is different from the processing target terminal station 20 of the first embodiment illustrated in FIG. 2 in that a terminal communication unit 51 is included instead of the terminal communication unit 32 and a data storage unit 52 is included instead of the data storage unit 33.

The terminal communication unit 51 includes reception units 511-1 to 511-N and reception waveform recording units 512-1 to 512-n. A reception unit 511-n (n is an integer of 1 or more and N or less) receives a signal via an antenna 31-n. The reception unit 511-n down-converts the reception signal and frequency-converts the reception signal from an RF signal to a baseband signal. The reception waveform recording unit 512-n samples the reception waveform of the reception signal subjected to the frequency conversion by the reception unit 511-n to generate waveform data indicating a value obtained by the sampling. The reception waveform recording unit 512-n writes reception waveform information in which the reception time of the reception signal, the identification information of the antenna 31-n, and the waveform data are set in the data storage unit 52. The data storage unit 52 stores the reception waveform information generated by each of the reception waveform recording units 512-1 to 512-N.

The base station 60 is different from the base station 40 illustrated in FIG. 2 in that a terminal signal reception processing unit 61 is further included. The terminal signal reception processing unit 61 inputs the reception waveform information obtained by demodulating and decoding the base station downlink signal by the base station signal reception processing unit 43. The terminal signal reception processing unit 61 performs reception processing for the reception signal indicated by the reception waveform information. The terminal signal reception processing unit 61 includes a distribution unit 611, reception processing units 612-1 to 612-N, signal storage units 613-1 to 613-N, a control unit 614, a reading unit 616, weight multiplication units 617-1 to 617-M, and demodulation units 618-1 to 618-M.

The distribution unit 611 reads the waveform data of the same reception time from the reception waveform information and outputs the read waveform data to the reception processing units 612-1 to 612-N in accordance with an antenna identifier associated with the waveform data. That is, the distribution unit 611 outputs the waveform data associated with the antenna identifier of the antenna 31-n to the reception processing unit 612-n. The reception processing unit 612-n performs the FFT after converting the reception signal indicated by the waveform data from an analog signal to a digital signal. The reception processing unit 612-n writes the reception signal on which the FFT has been performed into the signal storage unit 613-n.

The signal storage units 613-1 to 613-N, the control unit 614, the reading unit 616, the weight multiplication units 617-1 to 617-M, and the demodulation units 618-1 to 618-M perform operations similar to those of the signal storage units 322-1 to 322-N, the control unit 323, the reading unit 325, the weight multiplication units 326-1 to 326-M, and the demodulation units 327-1 to 327-M included in the mobile relay station 30 of the first embodiment, respectively. Note that the time may be set to the demodulation processing timing included in a storage unit 615 of the control unit 614 as in the first embodiment, or the processing order may be set.

Operation of the wireless communication system 12 will be described.

Figure 8:
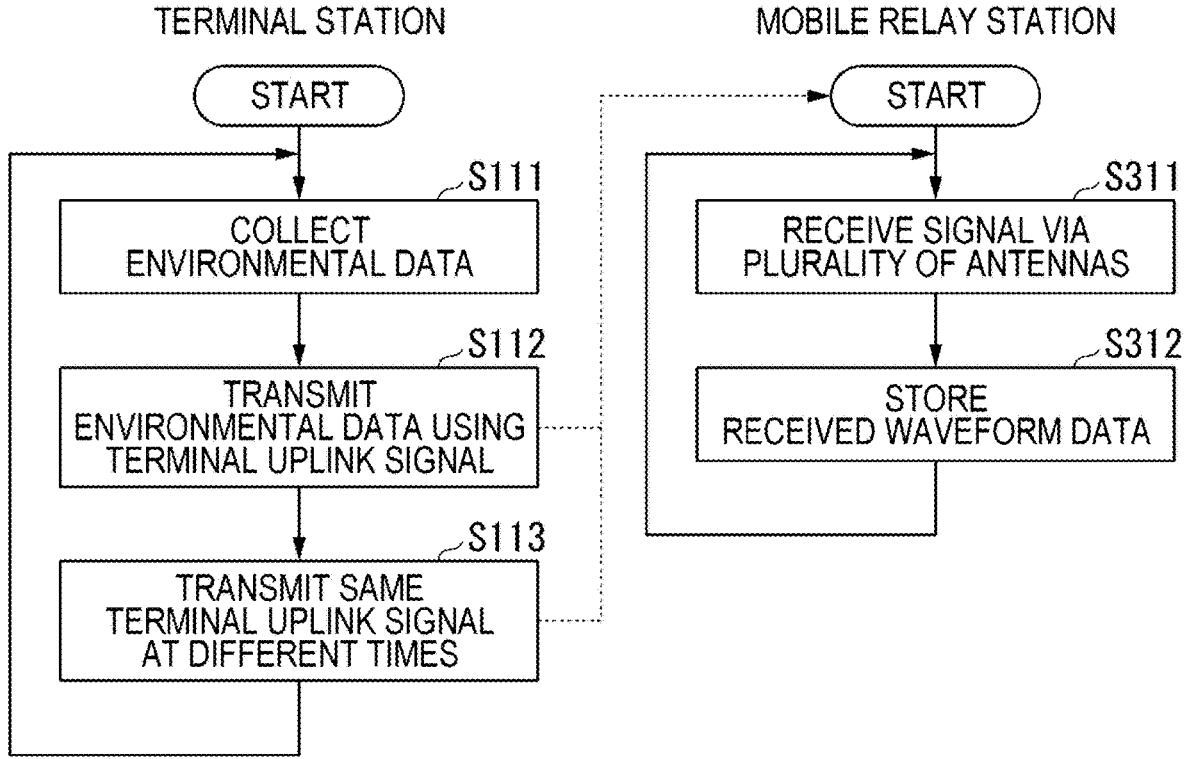
FIG. 8 is a flowchart illustrating processing of the wireless communication system according to the embodiment.

FIG. 8 is a flowchart illustrating processing of the wireless communication system 12 in a case where a terminal uplink signal is transmitted from the terminal station 20. The terminal station 20 performs the same processing as that of steps S111 to S113 of the first embodiment illustrated in FIG. 4.

The antennas 31-1 to 31-N of the mobile relay station 50 receive the terminal uplink signal transmitted from the terminal station 20 in step S112 or step S113 (step S311). The reception units 511-1 to 511-N down-convert the reception signals from the antennas 31-1 to 31-N, respectively. Each of the reception waveform recording units 512-1 to 512-N samples the waveform of the reception signal down-converted by each of the reception units 511-1 to 511-N, and generates waveform data indicating a value obtained by the sampling. Each reception waveform recording unit 512-n writes the reception waveform information in which the reception time, the identification information of the antenna 31-n, and the waveform data of the reception signal received by the antenna 31-n are associated with each other in the data storage unit 52 (step S312). The mobile relay station 50 repeats the processing from step S311.

Figure 9:
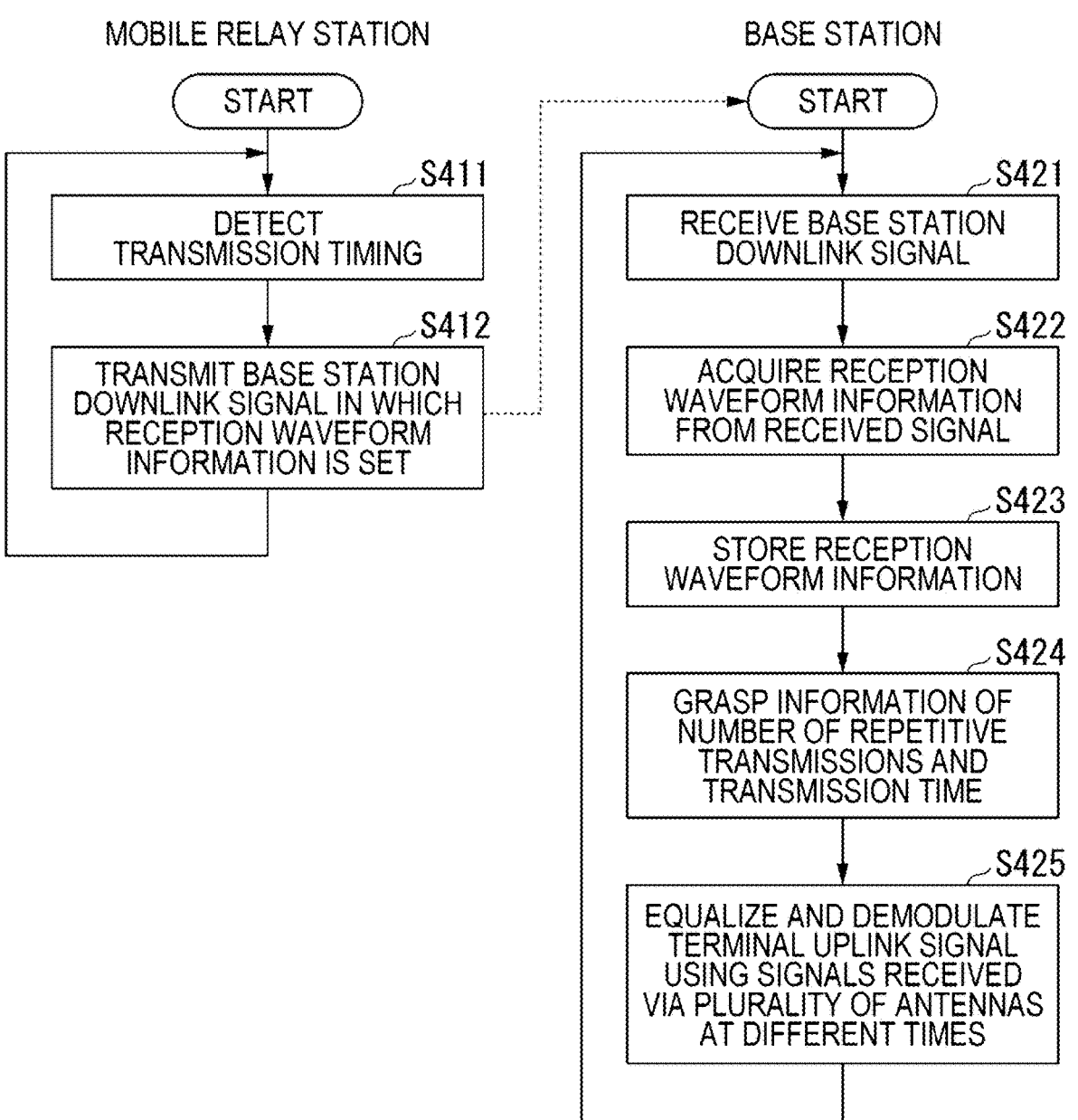
FIG. 9 is a flowchart illustrating processing of the wireless communication system according to the embodiment.
Figure 10:
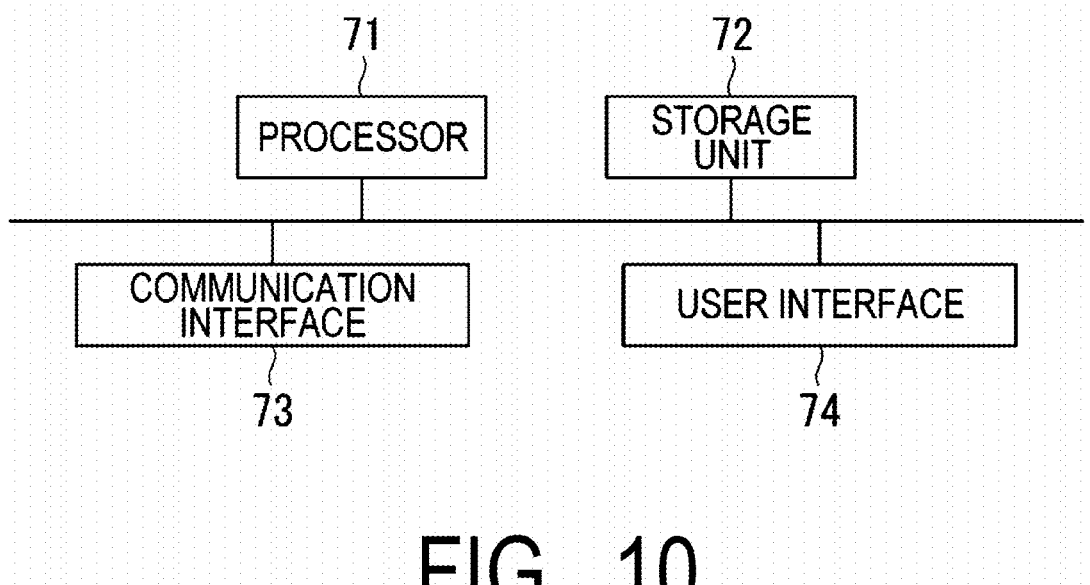
FIG. 10 is a hardware configuration diagram of a mobile relay station according to the first and second embodiments.

FIG. 9 is a flowchart illustrating processing of the wireless communication system 12 in a case where a base station downlink signal is transmitted from the mobile relay station 50. The base station communication unit 34 of the mobile relay station 50 detects that it is the transmission start timing stored in advance (step S411). The base station communication unit 34 reads the reception waveform information accumulated in the data storage unit 52 as transmission data, and generates a base station downlink signal in which the read transmission data is set. The base station communication unit 34 transmits the generated base station downlink signal via the antennas 35 (step S412). The mobile relay station 50 repeats the processing from step S411.

Each antenna station 41 receives the base station downlink signal from the mobile relay station 50 (step S421). Each antenna station 41 converts the base station downlink signal into an electric signal. The reception unit 42 synchronizes the timings of the reception signals received by the respective antenna stations 41, and multiplies the reception signals by the weight and adds the reception signals. The base station signal reception processing unit 43 demodulates the added reception signals and decodes the demodulated reception signals to obtain the reception waveform information (step S422). The base station signal reception processing unit 43 outputs the reception waveform information to the terminal signal reception processing unit 61.

The distribution unit 611 of the terminal signal reception processing unit 61 reads the waveform data of the same reception time from the reception waveform information obtained in step S422 and outputs the read waveform data to the reception processing units 612-1 to 612-N in accordance with the antenna identifier associated with the waveform data. That is, the distribution unit 611 outputs the waveform data associated with the antenna identifier of the antenna 31-*n* to the reception processing unit 612-*n*. The reception processing units 612-1 to 612-N convert the reception signal indicated by the waveform data input from the distribution unit 611 from an analog signal to a digital signal, and then perform the FFT on the reception signal. Each reception processing unit 612-*n* writes the reception signal on which the FFT has been performed into the signal storage unit 613-*n* (step S423).

The processing of the control unit 614, the reading unit 616, the weight multiplication units 617-1 to 617-M, and the demodulation units 618-1 to 618-M of the base station 60 in steps S424 to S425 is similar to the processing of the control unit 323, the reading unit 325, the weight multiplication units 326-1 to 326-M, and the demodulation units 327-1 to 327-M of the mobile relay station 30 in steps S122 to S123 of the first embodiment illustrated in FIG. 5.

That is, the control unit 614 reads the terminal identification information and the weight of each of the processing target terminal stations 20-1 to 20-M corresponding to the demodulation processing timing specified on the basis of the current time or the processing order from the demodulation processing information (FIG. 3) stored in the storage unit 615. The control unit 614 notifies the reading unit 616 of the terminal identification information of the processing target terminal stations 20-1 to 20-M. Further, the control unit 614 notifies each of the weight multiplication units 617-1 to 617-M of the weights of the processing target terminal stations 20-1 to 20-M.

The reading unit 616 reads the reception signal including the terminal uplink signal in which the terminal identification information of each processing target terminal station 20-*m* is set in the header from each of the signal storage units

613-1 to 613-N, and outputs the reception signal to the weight multiplication unit 617-*m*.

The reading unit 616 adds the antenna identification information of the antenna 31-*n* and the information of the header of the terminal uplink signal included in the reception signal to each reception signal output to the weight multiplication unit 617-*m* (step S424).

Each of the weight multiplication units 617-1 to 617-M arranges the reception signals input from the reading unit 616 in the order corresponding to signals $r_1, \ldots, r_{KM}$ on the basis of the information added to the reception signals. The weight multiplication unit 617-*m* multiplies the arranged reception signals by the weight received from the control unit 614 to perform MIMO equalization, thereby obtaining a terminal uplink signal $s_m$ of the processing target terminal station 20-*m*. Each demodulation unit 618-*m* detects a frame of the terminal uplink signal $s_m$ on which the MIMO equalization has been performed by the weight multiplication unit 617-*m*, and demodulates and decodes the detected frame to obtain environmental data (step S425).

When the storage unit 615 stores the demodulation processing information illustrated in FIG. 6, in step S424 of FIG. 6, the control unit 614 reads the terminal identification information and the weight of each of the processing target terminal stations 20-1 to 20-M, and the set of the number of transmissions and the reception time from the demodulation processing information, and notifies the reading unit 616 of the terminal identification information, the weight, and the set of the number of transmissions and the reception time. The reading unit 616 reads the reception signal at the reception time corresponding to each processing target terminal station 20-*m* from the signal storage units 613-1 to 613-N, and outputs the reception signal to the weight multiplication unit 617-*m*. The reading unit 616 adds antenna identification information of the antenna 31-*n* that has received the reception signal and the reception time and the number of transmissions of the reception signal to each reception signal to be output.

According to the embodiments described above, the moving relay device can accurately receive signals simultaneously transmitted from many wireless terminals. Note that, in the above embodiments, there has been described a case where a moving body equipped with the mobile relay station is a LEO satellite, but the moving body may be another flying object flying above the sky, such as a geostationary satellite, drone, or HAPS, or may be a moving body that moves on the ground.

According to the above-described embodiments, the wireless communication system includes a plurality of transmitting apparatuses and a communication apparatus that moves. For example, the transmitting apparatus is the terminal stations 2 and 20 of the embodiments, and the communication apparatus is the mobile relay stations 3 and 30 of the embodiments. The transmitting apparatus includes a transmission unit that transmits the same radio signal a plurality of times. For example, the radio signal is a terminal uplink signal of the embodiments. The communication apparatus includes a plurality of antennas, a signal storage unit, a reading unit, an equalization unit, and a demodulation unit. The plurality of antennas receives a radio signal transmitted from the plurality of transmitting apparatuses. The signal storage unit stores a reception signal received by each of the plurality of antennas. The reading unit reads, from the signal storage unit, a reception signal including a radio signal transmitted from a demodulation processing target transmitting apparatus, the reception signal being received by each of the plurality of antennas at different times. The equalization unit equalizes the plurality of reception signals read by the reading unit. For example, the equalization unit is the weight multiplication units 326-1 to 326-M of the embodiments. The demodulation unit demodulates the reception signals equalized by the equalization unit.

Alternatively, the wireless communication system includes a plurality of transmitting apparatuses, a communication apparatus that moves, and a receiving apparatus. For example, the transmitting apparatus is the terminal stations 2 and 20 of the embodiments, the communication apparatus is the mobile relay stations 3 and 50 of the embodiments, and the receiving apparatus is the base stations 4 and 60 of the embodiments. The transmitting apparatus includes a transmission unit that transmits the same radio signal a plurality of times. For example, the radio signal is a terminal uplink signal of the embodiments. The communication apparatus includes a plurality of antennas and a waveform transmission unit. The plurality of antennas receives a radio signal transmitted from the plurality of transmitting apparatuses. The waveform transmission unit transmits waveform data indicating the waveform of the reception signal received by each of the plurality of antennas to the receiving apparatus. For example, the waveform transmission unit is the base station communication unit 34 of the embodiments. The receiving apparatus includes a reception unit, a signal storage unit, a reading unit, an equalization unit, and a demodulation unit. The reception unit receives the waveform data transmitted by the communication apparatus. The signal storage unit stores the reception signal indicated by the waveform data received by the reception unit. The reading unit reads, from the signal storage unit, a reception signal including a radio signal transmitted from a demodulation processing target transmitting apparatus, the reception signal being received by each of the plurality of antennas at different times. The equalization unit equalizes the plurality of reception signals read by the reading unit. The demodulation unit demodulates the reception signals equalized by the equalization unit.

The reading unit may specify the reception signal including the radio signal transmitted from a demodulation processing target transmitting apparatus among the reception signals stored in the signal storage unit on the basis of the information set to the radio signal by the transmission unit, and read the specified reception signal. Alternatively, the reading unit may specify the reception signal at the reception time obtained on the basis of the position of the transmitting apparatus, the time when the transmitting apparatus transmits the radio signal, and the position of the communication apparatus at each time among the reception signals stored in the signal storage unit, and read the specified reception signal.

The equalization unit may perform equalization by multiplying a plurality of reception signals read by the reading unit by a weight calculated in advance on the basis of the position of the transmitting apparatus, the time when the transmitting apparatus transmits the radio signal, and the position of the communication apparatus at each time.

Note that the communication apparatus may be provided in a flying object such as a low earth orbit satellite. The transmitting apparatus and the receiving apparatus may be installed on the earth.

As described above, the embodiments of the present invention have been described in detail with reference to the drawings; however, a specific configuration is not limited to the embodiments and includes design and the like within the scope not departing from the gist of the present invention.

REFERENCE SIGNS LIST

1, 11, 12 Wireless communication system
2-1 to 2-3, 20 Terminal station
3, 30, 50 Mobile relay station
4, 40, 60 Base station
21 Data storage unit
22 Transmission unit
23, 31-1 to 31-N, 35 Antenna
32, 51 Terminal communication unit
33, 52 Data storage unit
34 Base station communication unit
41 Antenna station
42 Reception unit
43 Base station signal reception processing unit
61 Terminal signal reception processing unit
321-1 to 321-N, 5612-1 to 612-N Reception processing unit
322-1 to 322-N, 613-1 to 613-N Signal storage unit
323, 614 Control unit
324, 615 Storage unit
325, 616 Reading unit
326-1 to 326-M, 617-1 to 617-M Weight multiplication unit
327-1 to 327-M, 618-1 to 618-M Demodulation unit
511-1 to 511-N Reception unit
512-1 to 512-N Reception waveform recording unit
611 Distribution unit

The invention claimed is:

1. A wireless communication system comprising a plurality of transmitting apparatuses and a communication apparatus that moves,
   wherein
   each of the plurality of transmitting apparatuses includes a transmitter that transmits each of same radio signals at different times, and
   the communication apparatus includes
   a plurality of antennas that receives the radio signals having been transmitted from the plurality of transmitting apparatuses,
   a signal storage that stores reception signals having been received by each of the plurality of antennas,
   a reading circuitry that reads, from the signal storage, the reception signals including the radio signals having been transmitted from a demodulation processing target transmitting apparatus which is one of the plurality of transmitting apparatuses, the reception signals having been received by each of the plurality of antennas at different times,
   an equalizer equalization that equalizes the reception signals having been read by the reading circuitry, and
   a demodulator that demodulates the reception signals having been equalized by the equalizer.

2. The wireless communication system according to claim 1, wherein the reading circuitry specifies the reception signals including the radio signals having been transmitted from the demodulation processing target transmitting apparatus among the reception signals stored in the signal storage on a basis of information having been set to the radio signals by the transmitter, and reads the specified reception signals.

3. The wireless communication system according to claim 1, wherein the reading circuitry specifies each of the reception signals at a reception time obtained on a basis of a position of the demodulation processing target transmitting apparatus, a time when the demodulation processing target transmitting apparatus transmits the radio signal, and a position of the communication apparatus at each time among the reception signals stored in the signal storage, and reads the specified reception signals.

4. The wireless communication system according to claim 1, wherein the equalizer performs equalization by multiplying the reception signals having been read by the reading circuitry by a weight calculated in advance on a basis of a position of the demodulation processing target transmitting apparatus, a time when the demodulation processing target transmitting apparatus transmits the radio signal, and a position of the communication apparatus at each time.

5. The wireless communication system according to claim 1, wherein the communication apparatus is provided in a flying object.

6. The wireless communication system according to claim 1, wherein the communication apparatus is provided in a low earth orbit satellite, and the plurality of transmitting apparatuses is installed on earth.

7. A wireless communication system comprising a plurality of transmitting apparatuses, a communication apparatus that moves, and a receiving apparatus, wherein each of the plurality of transmitting apparatuses includes a transmitter that transmits each of same radio signals at different times, the communication apparatus includes a plurality of antennas that receives the radio signals having been transmitted from the plurality of transmitting apparatuses, and a waveform transmitter that transmits waveform data indicating waveforms of reception signals having been received by each of the plurality of antennas to the receiving apparatus, and the receiving apparatus includes a receiver that receives the waveform data having been transmitted by the communication apparatus, a signal storage that stores the reception signals indicated by the waveform data having been received by the receiver, a reading circuitry that reads, from the signal storage, the reception signals including the radio signals having been transmitted from a demodulation processing target transmitting apparatus which is one of the plurality of transmitting apparatuses, the reception signals having been received by each of the plurality of antennas at different times, an equalizer that equalizes the reception signals having been read by the reading circuitry, and a demodulator that demodulates the reception signals having been equalized by the equalizer.

8. The wireless communication system according to claim 7, wherein the reading circuitry specifies the reception signals including the radio signals having been transmitted from the demodulation processing target transmitting apparatus among the reception signals stored in the signal storage on a basis of information having been set to the radio signals by the transmitter, and reads the specified reception signals.

9. The wireless communication system according to claim 7, wherein the reading circuitry specifies each of the reception signals at a reception time obtained on a basis of a position of the demodulation processing target transmitting apparatus, a time when the demodulation processing target transmitting apparatus transmits the radio signal, and a position of the communication apparatus at each time among the reception signals stored in the signal storage, and reads the specified reception signals.

10. The wireless communication system according to claim 7, wherein the equalizer performs equalization by multiplying the reception signals having been read by the reading circuitry by a weight calculated in advance on a basis of a position of the demodulation processing target transmitting apparatus, a time when the demodulation processing target transmitting apparatus transmits the radio signal, and a position of the communication apparatus at each time.

11. The wireless communication system according to claim 7, wherein the communication apparatus is provided in a flying object.

12. The wireless communication system according to claim 7, wherein the communication apparatus is provided in a low earth orbit satellite, and the plurality of transmitting apparatuses is installed on earth.

13. A communication apparatus in a wireless communication system including a plurality of transmitting apparatuses and the communication apparatus that moves, the communication apparatus comprising:

a plurality of antennas that receives same radio signals for each of the plurality of transmitting apparatuses, each of the same radio signals having been transmitted at different times by each of the plurality of transmitting apparatuses;

a signal storage that stores reception signals having been received by each of the plurality of antennas;

a reading circuitry that reads, from the signal storage, the reception signals including the radio signals having been transmitted from a demodulation processing target transmitting apparatus which is one of the plurality of transmitting apparatuses, the reception signals having been received by each of the plurality of antennas at different times;

an equalizer that equalizes the reception signals having been read by the reading circuitry; and a demodulator that demodulates the reception signals having been equalized by the equalizer.

* * * * *